(12) United States Patent
Dellinger et al.

(10) Patent No.: US 8,563,140 B2
(45) Date of Patent: Oct. 22, 2013

(54) MOISTURE RESISTANT COATING

(75) Inventors: David A. Dellinger, Santa Barbara, CA (US); Elie Helou, Jr., Santa Barbara, CA (US); Drew V. Speer, Simpsonville, SC (US); Dwight W. Schwark, Simpsonville, SC (US)

(73) Assignee: Biosphere Industries, LLC, Carpinteria, CA (US)

( * ) Notice: Subject to any disclaimer, the term of this patent is extended or adjusted under 35 U.S.C. 154(b) by 314 days.

(21) Appl. No.: 12/691,620

(22) Filed: Jan. 21, 2010

(65) Prior Publication Data

US 2010/0203348 A1 Aug. 12, 2010

Related U.S. Application Data

(60) Provisional application No. 61/146,280, filed on Jan. 21, 2009, provisional application No. 61/227,744, filed on Jul. 22, 2009, provisional application No. 61/258,537, filed on Nov. 5, 2009.

(51) Int. Cl.
*B32B 23/04* (2006.01)

(52) U.S. Cl.
USPC ............... 428/532; 428/534; 523/128; 524/9; 106/162.51

(58) Field of Classification Search
USPC .................. 428/532, 534; 106/162.51; 524/9; 523/128
See application file for complete search history.

(56) References Cited

U.S. PATENT DOCUMENTS

| | | | | |
|---|---|---|---|---|
| 7,553,363 | B2 * | 6/2009 | Dellinger et al. | 106/162.51 |
| 7,585,905 | B2 * | 9/2009 | Shelton et al. | 524/35 |
| 7,893,138 | B2 * | 2/2011 | Shelton et al. | 524/35 |
| 8,003,715 | B2 * | 8/2011 | Shelton et al. | 524/39 |
| 8,039,531 | B2 * | 10/2011 | Shelton et al. | 524/35 |

* cited by examiner

*Primary Examiner* — Leszek Kiliman
(74) *Attorney, Agent, or Firm* — Perkins Coie LLP; Joseph P. Hamilton

(57) ABSTRACT

Some embodiments of the invention generally relate to a moisture barrier coating that is biodegradable and compostable. Some embodiments also relate to a coating that is dual ovenable. Such coatings may be used to increase moisture resistance and provide non-stick or release characteristics when applied to biodegradable and compostable disposable food packaging and food service items. In some embodiments, a plasticizer, an amide wax and optionally a rosin are added to a cellulose-ester-based coating to increase moisture resistance. In other embodiments, a biodegradable polymer, an amide wax, optionally a plasticizer, and optionally a rosin are added to a cellulose-ester-based coating to drastically increase moisture resistance. In still other embodiments, phospholipids or medium-chain triglycerides or increased levels of amide wax may be added to the either of the embodiments above to provide enhanced release characteristics.

28 Claims, 3 Drawing Sheets

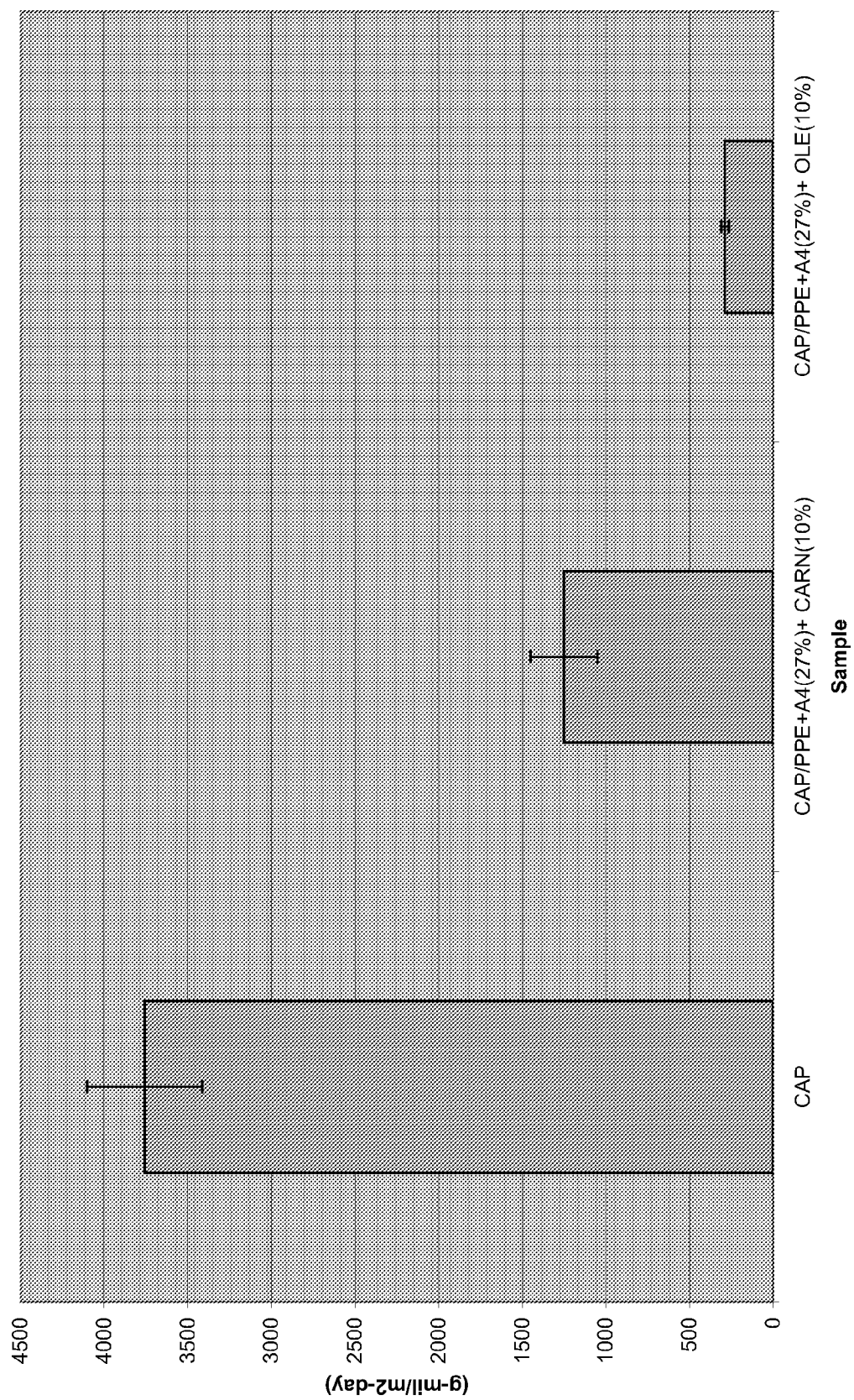
FIG. 1 - Effect of Natural Wax vs. Amide Wax

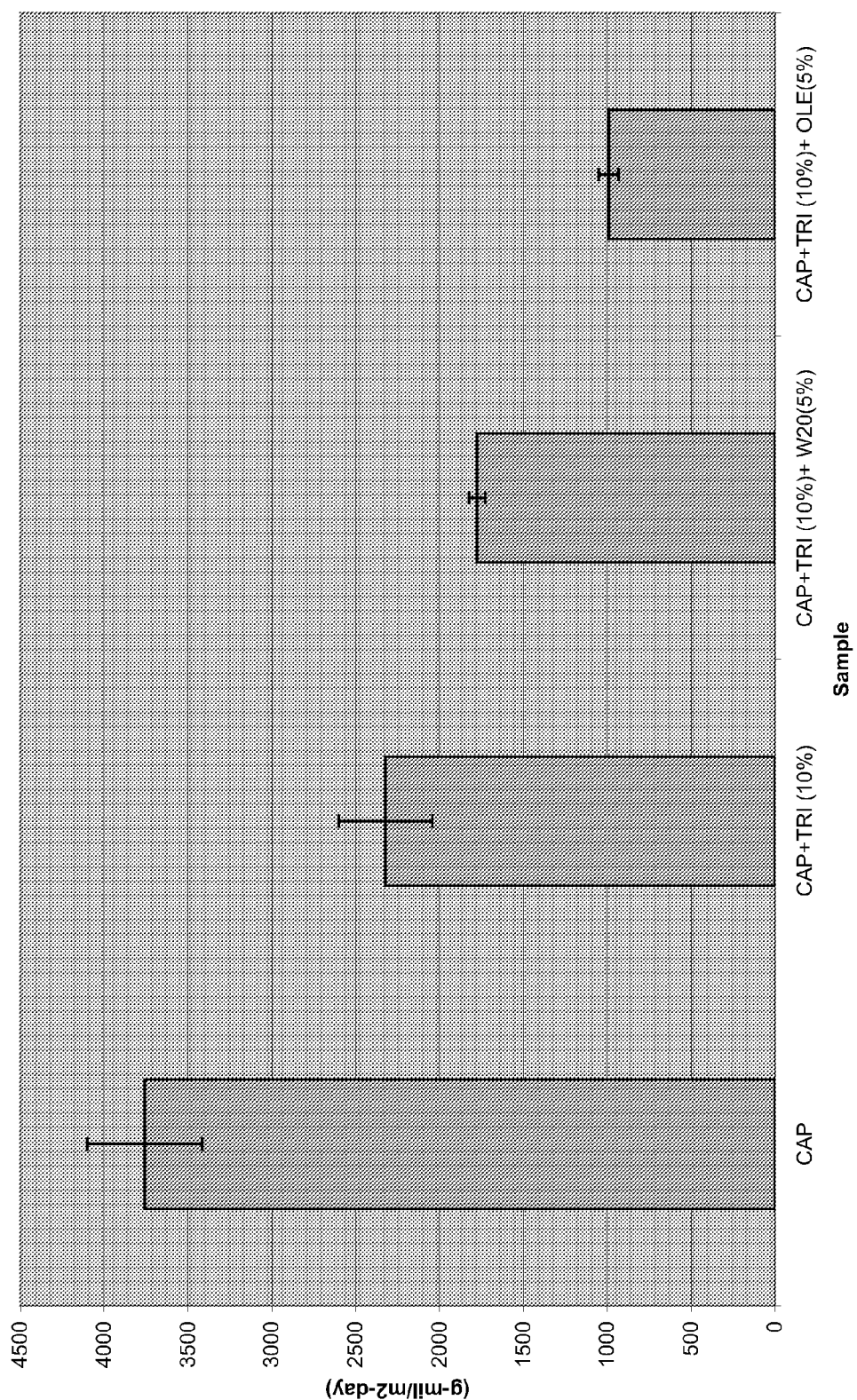
FIG. 2 - Amine Wax Additives

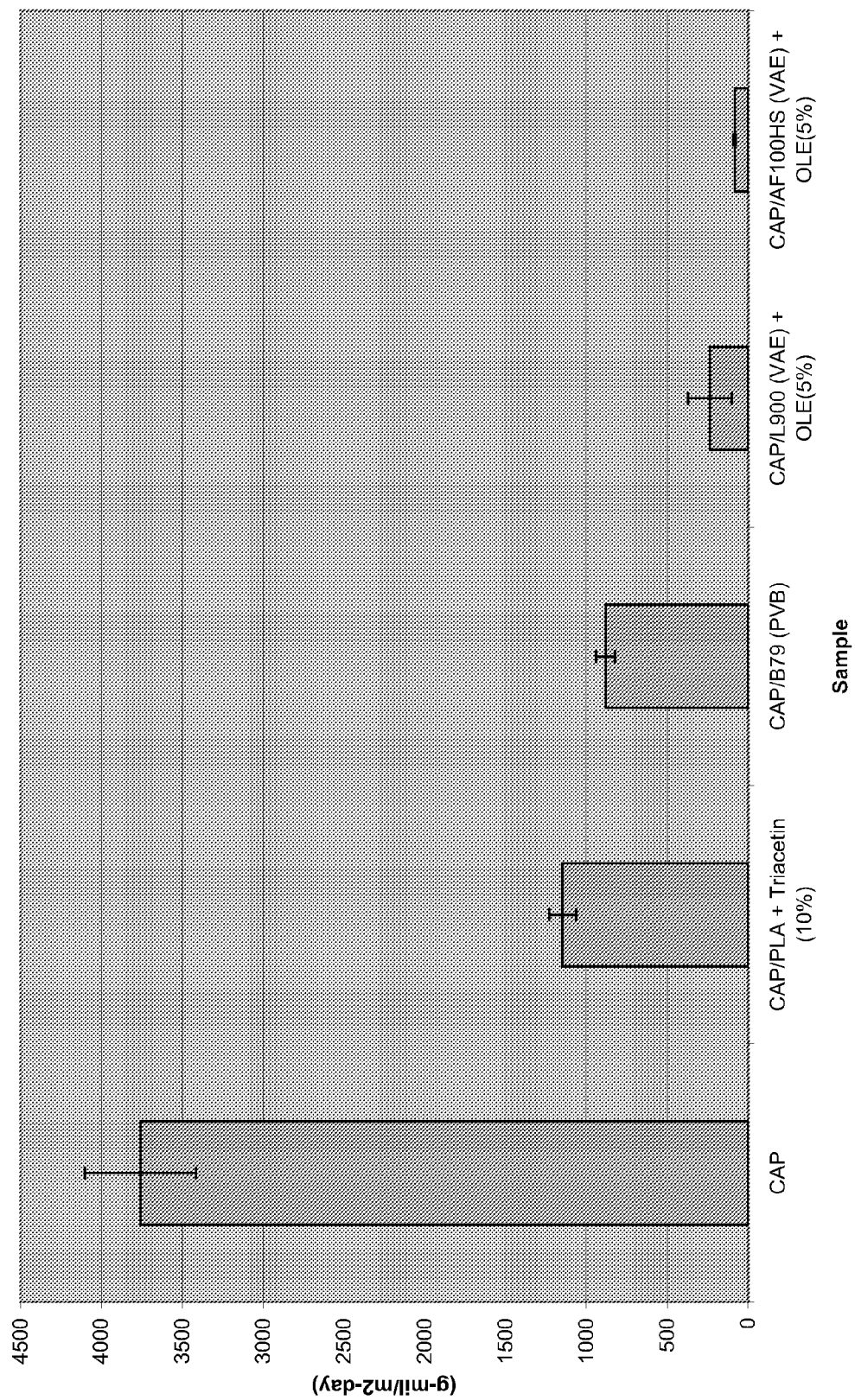

MOISTURE RESISTANT COATING

CROSS REFERENCE TO RELATED APPLICATIONS

This application claims the benefit of: 1) U.S. Provisional Patent Application No. 61/146,280, filed Jan. 21, 2009; 2) U.S. Provisional Patent Application No. 61/227,744, filed Jul. 22, 2009; and 3) U.S. Provisional Patent Application No. 61/258,537, filed Nov. 5, 2009, all of which are incorporated herein by reference.

BACKGROUND

Plastic and paper pollution are reaching epidemic levels, polluting our oceans and quickly filling our available landfill capacities. Conventional disposable food service items are an example of this pollution. They are commonly made from paper or paperboard which is coated, impregnated, or laminated with a polymeric waterproofing material such as wax polyethylene or a polyester film or made from one of a variety of plastics (polystyrene is the most common). These materials have good to excellent resistance to moisture, can be insulating (e.g., foamed polystyrene or "Styrofoam"), and are inexpensive and durable. In addition, ovenable disposables are made from aluminum or CPET, commonly known as dual ovenable plastic.

The current drive by many countries to reach industrial status has greatly reduced the free time that its working population has for preparing food at home or for creating specialty items. As this trend continues to accelerate, the demand for disposable packaging is growing exponentially. Moreover, there is a growing recognition that the environmental costs (from production through disposal) of using these "cheap" materials may be quite high compared to natural products that are biodegradable and/or compostable. The expected lifetime of a polystyrene cup, for example, can be up to 500 years, and each American disposes an average of about 100 of these cups per year. Further, polystyrene is made by chemical processing of benzene and ethylene, both byproducts of a petroleum industry that is recognized for its environmental problems. While governments around the world have all but given up on implementing recycling programs as unworkable and too costly, they still have the problem of garbage accumulation to solve and many have started taxing non-degradable packaging. There is a need to address environmental concerns with respect to disposable food service and food packaging items.

The biggest challenge in making durable, disposable food service and packaging articles that address the environmental concerns discussed above is an inherent lack of moisture resistance. All biological processes that result in the degradation of organic materials rely upon water to function. As a result, it is very difficult to make a material highly moisture resistant that will also be biodegradable and compostable.

One method currently used to address environmental concerns about conventional disposable food container products is the manufacture of starch and/or cellulosic-based disposable food service items such as trays, plates, and bowls. Many starch and/or cellulosic-based packaging materials have several drawbacks, the most important being that the containers are susceptible to water. Cooked, unmodified starch is typically water soluble. Because all of the starch-based biodegradable food service items currently being manufactured are formed in heated molds, much or all of the starch in these items is cooked, and the products thus formed are sensitive to moisture. Cellulose fiber (e.g., paper and paperboard or pulp) and cellulose derivatives (e.g., cellophane and cellulose esters, ethers, etc.) are also quite permeable to water. When exposed to water, other aqueous fluids, or significant amounts of water vapor, these items may become very soft, losing form-stability and becoming susceptible to puncture by cutlery (e.g., knives and forks).

Improvements to and/or cellulosic-based biodegradable articles may be made to make them more moisture resistant. Improvements may also serve to strengthen the matrix material by enhancing the chemical and physical properties, and include the addition of wax or wax emulsions, fiber sizing agents, plasticizers, polymers, or a combination thereof. These articles perform the best under low-moisture conditions in food and non-food applications alike. Examples of said biodegradable containers are found in U.S. Pat. No. 7,553,363, granted Jun. 30, 2009; U.S. patent application Ser. No. 11/285,508, filed Nov. 21, 2005; U.S. patent application Ser. No. 12/168,049, filed Jul. 3, 2008; and U.S. patent application Ser. No. 12/257,289, filed Oct. 23, 2008; which, by reference, are incorporated herein in their entirety.

Some applications further require increased moisture resistance. For example, some convenience foods and drinks that require the addition of hot or boiling water such as soups or instant coffee must have a container that is more capable of resisting moisture absorption than a plate that is being used to heat solid food, such as a piece of leftover chicken. Further examples of the type of demanding applications that may require increased moisture resistance are pre-made, ready to eat meals for schools, prisons and other institutions, bakery items, frozen or refrigerated prepared meals, soup and noodle bowls, cups for coffee, hot chocolate, and other beverages, cereal bowls, ice cream and yogurt cups, and other similar high-moisture applications. One way to improve to the moisture resistance of various biodegradable materials is by applying a coating to the product. In addition to moisture resistance, some applications require non-stick or release characteristics. Such applications include bakery items, for example, pies, breads, muffins, pizza, cakes and the like.

In keeping with the desire to produce biodegradable and compostable containers, it is also desirable for a coating that increases the moisture resistance to be biodegradable and compostable. Cellulose esters are biodegradable and are known in the art as base polymers used in coatings and inks. By themselves, cellulose esters have a very high moisture vapor transmission rate (MVTR) and thus offer only short term resistance to water.

A coating that has moisture resistance sufficient for high-moisture applications as described above, as well as economically efficient and completely biodegradable and compostable has yet to be perfected.

It is therefore an object of some embodiments of the present invention to provide a fully biodegradable and compostable coating with improved moisture resistance such that the Moisture Vapor Transmission Rate (MVTR) is significantly reduced, thus allowing use in high moisture applications.

It is further an object of some embodiments of the present invention comprising wax to reduce or eliminate the need to coat food service or packaging items at elevated temperatures or to expose such items to prolonged drying/heating above the melting point of the wax in order to obtain the lowest MVTR.

It is a further object of some embodiments of the present invention to provide a highly moisture-resistant coating that is also cost-effective.

It is a further an object of some embodiments of the present invention to provide a highly moisture-resistant coating that is dual ovenable, heat sealable, and which provides product release in bakery applications.

SUMMARY

Some embodiments of the present invention provide novel formulations for biodegradable and compostable coatings, with increased moisture resistance suited for use on various highly absorbent and/or permeable substrates. One embodiment provides a biodegradable and compostable coating for biodegradable and compostable disposable items that can serve as functional packaging and/or service items for high-moisture applications. Such applications may, for example include ice cream and other frozen dessert products; pre-made, ready-to-eat fresh or frozen prepared meals; soup and/or noodles; coffee, hot chocolate and other beverages; cereal; yogurt; baked goods such as cakes, muffins, cookies, and breads; fruit, meat and vegetable pies; pizza pies, candy products; and other high-moisture products designed to be eaten by humans or animals. Another embodiment provides a biodegradable and compostable coating for biodegradable and compostable disposable items that is dual ovenable (i.e., may be used in both microwave and conventional ovens) and offers improved product release in bakery applications. Another embodiment provides a biodegradable and compostable coating for biodegradable and compostable disposable items that is heat sealable. Another embodiment provides a biodegradable and compostable coating with improved moisture resistance in order to allow biodegradable and compostable disposable items to be used in high moisture applications. Another embodiment provides method of manufacturing a biodegradable and compostable coating for biodegradable and compostable disposable items that has improved moisture resistance. Other embodiments comprising a wax provide a method of coating biodegradable and compostable disposable items such that the improved moisture barrier property is obtained without the need to coat at elevated temperature or prolonged drying or heating above the melting point of the wax.

Other features and advantages of the present invention will become apparent from the following detailed description. It should be understood, however, that the detailed description and the specific examples, while indicating the preferred embodiments of the present invention, are given by way of illustration only, since various changes and modifications within the spirit and scope of the present invention will become apparent to those skilled in the art from this detailed description.

BRIEF DESCRIPTION OF THE FIGURES

FIG. 1 shows the effect of carnauba wax on moisture resistance (as measured by MVTR) compared to the effect of the amide wax oleamide on MVTR.

FIG. 2 shows the effect of two different amide waxes, N-N'-Ethylene-bis-oleamide (W20) and oleamide on moisture resistance (as measured by MVTR).

FIG. 3 shows the effect of three biodegradable polymers: polyvinyl butyral (PVB), polylactic acid (PLA) and polyvinyl acetate-ethylene (VAE), introduced to the solvent based coating solutions as either a solid or as an aqueous emulsion, on moisture resistance (as measured by MVTR).

DETAILED DESCRIPTION

In order to fully understand the manner in which the above-recited details and other advantages and objects according to the invention are obtained, a more detailed description of the invention will be rendered by reference to specific embodiments thereof.

In one embodiment, a biodegradable and compostable coating may be applied to biodegradable and compostable disposable articles such that it partially or completely permeates the outer and/or inner surface of the item or items, improving water resistance and heat seal properties of the container.

The coating may be applied to an article using any means known in the art of coating paper, paperboard, plastic, film, polystyrene, sheet metal, glass, or other packaging materials, including blade, puddle, air-knife, printing, Dahlgren, gravure, curtain, dip and powder coating. Coatings may also be applied by spraying the article with a biodegradable and compostable coating formulation or dipping the article into a vat containing a biodegradable and compostable coating formulation or passing the article through a curtain of the coating formulation as described by any of the embodiments of the present invention. The apparatus used to coat the articles will depend on the shape of the article. For example, flat articles may be coated differently than cups, bowls and the like.

Depending on the selection of ingredients below, some embodiments are dual ovenable and/or heat sealable and may include product release properties in bakery applications.

One formulation according to an embodiment of the present invention from which a biodegradable and compostable coating for biodegradable and compostable disposable items can be made provides for a cellulose ester, the addition of one or more plasticizers, a wax, and optionally rosin.

Another formulation according to an embodiment of the present invention from which a biodegradable and compostable coating can be made provides for a cellulose ester, one or more biodegradable polymers or copolymers, a wax, optionally rosin and optionally one or more plasticizers.

Another formulation according to an embodiment of the present invention from which a biodegradable and compostable coating can be made provides for a cellulose ester, one or more release agents, optionally one or more biodegradable polymers or copolymers, optionally one or more waxes, and optionally one or more plasticizers.

Cellulose Esters

Various types of cellulose esters can be used as a base for a biodegradable and compostable coating. Preferred cellulose esters used in some embodiments of the present invention include cellulose acetate propionate (CAP), cellulose acetate butyrate (CAB), cellulose acetate (CA), and nitrocellulose (NC). In some embodiments where an ovenable coating is desired the preferred cellulose esters are CAP, CAB, and CA.

Plasticizers

The plasticizer used with these coatings should be environmentally friendly, e.g., inherently biodegradable and/or natural and/or based bioderived carbon compounds. It is preferred to choose a plasticizer that promotes biodegradation, as some plasticizers may cause undesirable slowing of biodegradation. Thus, the preferred plasticizers for use with this invention are citric acid esters such as triethyl citrate, tributyl citrate, and acetylated tributyl citrate, triacetin (glycerol triacetate), and tributyrin (glycerol tributyrate). Especially preferred is triacetin since it is generally regarded as safe (GRAS) in the United States and European Union. In some embodiments, the concentration of plasticizer in the coating is about 0% to about 30%, about 5% to about 20%, or more preferably about 10% of the dry weight of the formulation.

Waxes

Waxes are used to improve moisture resistance in biodegradable products, reduce coefficient of friction and also provide some release characteristics to the coating. Typical waxes for such use are, for example, carnauba, candelilla, beeswax, and paraffin. However, in the prior art cellulose ester barrier coatings that include wax have generally relied upon coating and/or drying above the melting point of the wax in order to obtain the greatest moisture barrier property. In some embodiments of the current invention, the use of soluble amide waxes was found to improve the moisture barrier property of the coating by a factor of more than three and to obviate the need to coat and/or dry the coating above the melting point of the wax in order to obtain the best moisture barrier. While various waxes may be used, it is desirable to use solvent-soluble amide waxes, not only for their moisture-resistance properties, but because they are less expensive than waxes like carnauba. Examples include oleamide, stearamide, erucamide, oleyl palmitamide, N,N'-ethylene-bis-stearamide and the like. In particular it is desired to use N,N'-ethylene-bis-oleamide, and especially oleamide. These soluble amide waxes, and to a lesser degree stearamide-based waxes are soluble in non-HAPS (hazardous air pollutant) ester/alcohol/ketone and hydrocarbon solvent blends advantageously used in these coatings. In some embodiments, the concentration of wax in the coating is about 0% to about 15%, about 5% to about 10%, or about 5-8% of the dry weight of the formulation.

Release Agents

When it is desirable for the coating to provide superior release properties as in, for example, bakery applications (pies, breads, muffins, cakes, and the like), it is advantageous to incorporate one or more release agents. Suitable release agents include phospholipids such as lecithin and phosphated mono and diglycerides, polydimethylsiloxane, and triglycerides. In addition to providing release, triglycerides can also act as a carrier for lecithin. In an application in which miscibility in alcohol solvents is desired, medium chain triglycerides (MCT) may be used. Medium chain triglycerides are defined as having fatty acids of 6-12 carbon atoms esterified with glycerol.

Biodegradable Polymers

It has been found that biodegradable polymers can be used with the cellulose ester based coatings to provide lower cost and in some cases dramatically improved moisture barrier properties. Examples of suitable biodegradable polymers include, without limitations, polyvinyl acetate polymers, polylactic acid polymers (PLA) or polyvinyl butyral copolymers (PVB). In some embodiments, the biodegradable polyvinyl acetate polymer is a polymer selected from the group consisting of poly(vinyl acetate) (PVA), poly(vinyl acetate-ethylene) (VAE) copolymer, and poly(ethylene-vinyl acetate) (EVA) copolymer. EVA is defined as a copolymer of ethylene and vinyl acetate with less than 50 wt. % vinyl acetate, whereas VAE is defined as a copolymer of ethylene and vinyl acetate with more than 50 wt. % vinyl acetate and is a typically an amorphous polymer with no defined melting point. In some embodiments, the ratio of the cellulose ester to biodegradable polymer is 1:3. In other embodiments, the ratio of the cellulose ester to biodegradable polymer is 1:1 to 3:1. Preferably, the ratio of cellulose ester to biodegradable polymer is 1:2 to 1:1.

When added to the cellulose-ester based coating, these polymers can increase the moisture resistance of the compositions, improve adhesion to the substrate and improve heat sealability. Surprisingly, it was found that aqueous lattices of PVA and VAE may be used in a homogeneous solvent-borne coating composition to provide improved overall coating performance. The effect on the moisture barrier is synergistic, providing a better barrier than the individual components. In some cases, the addition of a biodegradable polymer can make the coating more cost effective. In one embodiment, polylactic acid can lower the cost of the coating while improving the MVTR. In a preferred embodiment, it is found that polyvinyl acetate polymers, especially vinyl acetate/ethylene copolymers, are remarkably compatible with CAP and appear to act as polymeric plasticizers and provide homogeneous solvent-borne coating solutions from aqueous latticies. The net result is an outstandingly clear coating with dramatically improved moisture resistance. It has been demonstrated through lab testing that at least certain grades of VAE are biodegradable as defined in ASTM D 6400-04.

Rosin

Generally, any rosin, rosin derivative, or natural gum may be used with the coating. It is preferred to use dimerized rosin and glycerol esters of partially dimerized rosin, because their addition results in considerably lower MVTR coatings than other types of rosin. Rosins and other natural gums are used to improve the adhesion of the coating to the substrate and to any additional films or coatings adhered to the moisture resistant coating layer. In some embodiments, the concentration of rosin in the coating is about 0% to about 50%, or about 0% to about 35% of the dry weight of the formulation.

Solvent

The coating is preferably solvent borne. Suitable solvents include methyl acetate, ethyl acetate, propyl acetate, butyl acetate, ethanol, propanol, acetone, water, hydrocarbons and the like in various proportions as required for solubility and coatability of the ingredients. It is preferred that the solvents be non hazardous air pollutants (HAP) and be obtainable from non-petroleum sources. Especially preferred are ethanol/n-propyl acetate and i-propanol/methyl acetate. Acetone, methyl acetate, and t-butyl acetate are also preferred because they are typically exempt from VOC regulations.

EXAMPLE 1

Additives to Cellulose-Ester-Based Coatings Improve Moisture Resistance

Several additives have been found that improve the moisture resistance of cellulose ester based coatings as measured by the Moisture Vapor Transmission Rate (MVTR) on a free standing film. MVTR value were determined by covering a water-containing cell with a thin film of the sample material, placing the cell into an environment with controlled temperature, then measuring the weight of liquid water lost (g) from the cell through a fixed surface area ($m^2$) in a specific time period (days). The values were normalized to a film with a thickness of 1 mil (0.001 inch). For these experiments, the temperature of the cell was held at 40° C. (100% RH inside, ambient RH outside). ASTM E96/E 96M-05 describes Standard Test Methods for Water Vapor Transmission of Materials. A decrease in the MVTR indicates an increase in the moisture resistance of the coating formulation.

Table 1 shows a Summary of MVTR Data at 40° C. (g-mil/$m^2$-day) measured on free standing films of various coating compositions. The free standing films were cast from solvent on glass or Teflon coated plates and typically dried for two minutes at 60° C. Formulations include one or more of the following compositions: cellulose acetate propionate, cellulose acetate butyrate, triacetin, A4 (acetyl tributyl citrate), C4 (tributyl citrate), epoxidized linseed oil, N,N'-ethylene-bis-oleamide, oleamide, carnauba wax, Dymerex, Pentalyn C, Poly-Pale Ester 10, polyvinyl acetate-ethylene, polyvinyl acetate, polyvinyl acetate-acrylic, polyvinyl butyral polymer, and polylactic acid polymer. The formulations can be placed in the following categories:

1) cellulose ester with a plasticizer,
2) cellulose ester with a plasticizer and a rosin,
3) cellulose ester with a plasticizer and a wax,
4) cellulose ester with a plasticizer, wax and a rosin,
5) cellulose ester with a biodegradable polymer,
6) cellulose ester with a biodegradable polymer and a plasticizer,
7) cellulose ester with a biodegradable polymer, plasticizer and a wax,
8) cellulose ester with a biodegradable polymer and a wax,
9) cellulose ester with a biodegradable polymer, a wax and a rosin,
10) cellulose ester with a biodegradable polymer, a plasticizer, a wax and a rosin,
11) biodegradable polymer alone, and
12) biodegradable polymer with a wax.

The samples in these categories are compared to that of CAP alone (or CAP with plasticizer) to determine the relative effect of the additive or combination of additives on moisture resistance. Groups 3, 4, 8 and 9 had the most dramatic effect on moisture resistance. Films as described in Table 1 were typically prepared by dissolving the materials in alcohol/ester solvent blends and casting films on glass or Teflon plates. The cast films were dried for several minutes at 60° C. Some solvent mixtures further included acetone and water. With PLA pure acetone was typically used to provide the lowest viscosity. Unless otherwise indicated, weights of rosin are by weight of the polymer and weights of plasticizer and wax are by weight of the polymer, polymer blend, or polymer/rosin solids. A typical formulation for casting films of cellulose ester blends with plasticizer, wax, and optionally rosin (categories 1-4) would be as follows:

59.5 g denatured ethanol
15 g CAP
25.5 g n-propyl acetate
1.5 g triacetin
0.75 g oleamide A typical formulation for casting films of cellulose ester blends with a biodegradable polymer, wax, and optionally plasticizer and rosin (categories 5-10) would be as follows:

9.38 g denatured ethanol
2.5 g CAP
4.02 g n-propyl acetate
9 g acetone
4.5 g AF100
0.25 g oleamide

TABLE 1

| Sample | MVTR ± S.D. (g-mil/m$^2$-day) at 40° C. | Category |
| --- | --- | --- |
| CAP | 3758 ± 343 | comparative |
| CAP + triacetin (5%) | 2519 ± 194 | 1 |
| CAP + triacetin (10%) | 2323 ± 280 | 1 |
| CAP + triacetin (20%) | 3134 ± 291 | 1 |
| CAP/CAP2 (3/1) + triacetin (10%) | 2600 ± 196 | 1 |
| CAP/CAB (3/1) + triacetin (10%) | 2030 ± 72 | 1 |
| CAP + A4 (5%) | 4119 ± 473 | 1 |
| CAP + A4 (10%) | 1884 ± 449 | 1 |
| CAP + A4 (20%) | 4511 ± 423 | 1 |
| CAP + C4 (5%) | 2081 ± 191 | 1 |
| CAP + C4 (10%) | 2133 ± 220 | 1 |
| CAP + C4 (20%) | 1692 ± 109 | 1 |
| CAP + ELO (5%) | 3210 ± 334 | 1 |
| CAP + ELO (10%) | 3694 ± 113 | 1 |
| CAP + W20 (5%) + triacetin (10%) | 1776 ± 48 | 3 |

TABLE 1-continued

| Sample | MVTR ± S.D. (g-mil/m$^2$-day) at 40° C. | Category |
| --- | --- | --- |
| CAP + Oleamide (5%) + triacetin (10%) | 991 ± 59 | 3 |
| CAP + Erucamide (5%) + triacetin (10%) | 3543 ± 73 | 3 |
| CAP + Kem P181 (5%) + triacetin (10%) | 3843 ± 130 | 3 |
| CAP + Paricin 220 (5%) + triacetin (10%) | 3533 ± 245 | 3 |
| CAP + Dymerex (20%) + triacetin (10%) | 1093 ± 76 | 2 |
| CAP + Dymerex (20%) + Oleamide (5%) + triacetin (10%) | 2014 ± 182 | 4 |
| CAP + Pentalyn (20%) + triacetin (10%) | 2100 ± 117 | 2 |
| CAP/PPE10 (1.6/1) + A4 (10%) | 811 ± 52 | 2 |
| CAP/PPE10 (1.6/1) + Carn (10%) + A4 (27%) | 1275 ± 200 | 4 |
| CAP/PPE10 (1.6/1) + W20 (10%) + A4 (27%) | 2447 ± 552 | 4 |
| CAP/PPE10 (1.6/1) + Oleamide (10%) + A4 (27%) | 288 ± 23 | 4 |
| CAP/PPE10 (1.6/1) + Oleamide (10%) + Triacetin (10%) | 122 ± 30 | 4 |
| CAP/PPE10 (1.6/1) + Oleamide (5%) + Triacetin (10%) | 1016 ± 28 | 4 |
| CAP/PPE10/L900 (2/1/1) + Oleamide (10%) | 100 ± 24 | 9 |
| CAP/PPE10/AF100 (2/1/1) + Oleamide (10%) | 178 ± 59 | 9 |
| CAP/PPE10/AF100 (2/1/1) + Oleamide (5%) | 998 ± 146 | 9 |
| CAP/PPE10/B79 (2/1/1) + Oleamide (10%) + Triacetin (10%) | 237 ± 116 | 10 |
| CAP/PLA (1/1) + Triacetin (10%) | 1148 ± 84 | 6 |
| CAP/PLA (1/1) + Triacetin (10%) + Oleamide (5%) | 1630 ± 153 | 7 |
| CAP/PLA/AF100 (1/1/1) + oleamide (5%) | 877 ± 38 | 8 |
| CAP/PLA/AF100 (1/2/1) + triacetin (2.5%) + oleamide (5%) | 770 ± 50 | 7 |
| CAP/L900 (1/1) + Triacetin (10%) | 2279 ± 269 | 6 |
| CAP/L900 (1/1) | 1591 ± 63 | 5 |
| CAP/L900 (1/1) + Oleamide (5%) | 236 ± 136 | 8 |
| CAP/L900 (3/1) + Oleamide (5%) | 1082 ± 132 | 8 |
| CAP/L900 (1/3) + Oleamide (5%) | 588 ± 646 | 8 |
| CAP/L686 (1/1) | 2539 ± 112 | 5 |
| CAP/AF100 (1/1) | 2172 ± 181 | 5 |
| CAP/AF100 (1/1) + Oleamide (5%) | 84 ± 7 | 8 |
| CAP/AF100 (1/1) + Oleamide (5%) (add AF last) | 43 ± 6 | 8 |
| CAP/AF100 (1/1) + Oleamide (5%) (w/ i-propanol/methyl acetate) | 47 ± 10 | 8 |
| CAP/AF100 (1/1) + Oleamide (10%) | 161 ± 77 | 8 |
| CAP/AF100 (3/1) + Oleamide (10%) | 291 ± 176 | 8 |
| CAP/AF100 (3/1) + Oleamide (5%) | 998 ± 132 | 8 |
| CAP/AF100 (1/1) + Paricin 220 (5%) | 2055 ± 92 | 8 |
| CAP/AF100 (1/1) + MP70 (5%) | 2315 ± 147 | 8 |
| CAP2/AF100 (1/1) | 2049 ± 45 | 5 |
| CAP2/AF100 (1/1) + Oleamide (5%) | 1940 ± 550 | 8 |
| CAP2/AF100 (1/2) + Oleamide (5%) | 600 ± 170 | 8 |
| CAP2/AF100 (1/2) + Oleamide (2.5%) | 388 ± 25 | 8 |
| CAP2/AF100 (1/3) + Oleamide (5%) | 647 ± 27 | 8 |
| CAB/AF100 (1/1) + Oleamide (5%) | 554 ± 167 | 8 |
| CAB2/AF100 (1/1) + Oleamide (5%) | 710 ± 142 | 8 |

TABLE 1-continued

| Sample | MVTR ± S.D. (g-mil/m²-day) at 40° C. | Category |
|---|---|---|
| CAB3/AF100 (1/1) | 2050 ± 23 | 5 |
| CAB3/AF100 (1/1) + Oleamide (5%) | 370 ± 147 | 8 |
| CAB3/AF100 (1/1) + Oleamide (2.5%) | 328 ± 70 | 8 |
| CAB3/AF100 (1/2) + Oleamide (5%) | 387 ± 48 | 8 |
| CAB3/AF100 (1/3) + Oleamide (5%) | 379 ± 79 | 8 |
| CN/AF100 (1/1) + Oleamide (5%) | 614 ± 75 | 8 |
| CA/AF100 (1/1) + Oleamide (5%) | 1502 ± 251 | 8 |
| CA/CAB/AF100 (1/1/2) + Oleamide (5%) | 201 ± 64 | 8 |
| CA2/AF100 + Oleamide (5%) | 2041 ± 414 | 8 |
| CAP/V828M (1/1) + triacetin (5%) + oleamide (5%) | 2585 ± 2218 | 7 |
| CAP/AF1082 (1/1) + triacetin (5%) + oleamide (5%) | 505 ± 110 | 7 |
| CAP/AF100 (1/1) + triacetin (5%) + oleamide (5%) | 492 ± 46 | 7 |
| CAP/Flex 825 (1/1) + triacetin (10%) + oleamide (5%) | 855 ± 398 | 7 |
| CAP/AF811 (1/1) + oleamide (5%) | 1156 ± 207 | 8 |
| CAP/AF192 (1/1) + oleamide (5%) | 895 ± 292 | 8 |
| CAP/AF1165 (1/1) + oleamide (5%) | 154 ± 84 | 8 |
| CAP/B79 (1/1) | 883 ± 59 | 5 |
| CAP/B79 (1/1) + Oleamide (5%) | 1371 ± 112 | 8 |
| B79/L900 (1/1) | 558 ± 80 | 11 |
| B79/L900 (1/1) + Oleamide (5%) | 547 ± 99 | 12 |
| B79 | 319 ± 44 | 11 |
| PLA + Oleamide (5%) | 213 ± 70 | 12 |
| PLA/AF100 (1/1) + Oleamide (5%) | 1151 ± 294 | 12 |
| PLA/AF100 (2/1) + Oleamide (5%) | 228 ± 135 | 12 |

Legend:

| Code | Full Name | Composition Type |
|---|---|---|
| CAP | CAP482-0.5 cellulose acetate propionate | Cellulose ester |
| CAP2 | CAP504-0.2 cellulose acetate propionate | Cellulose ester |
| CAB | CAB551-0.01 cellulose acetate butyrate | Cellulose ester |
| CAB2 | CAB381-0.5 cellulose acetate butyrate | Cellulose ester |
| CAB3 | CAB553-0.4 cellulose acetate butyrate | Cellulose ester |
| CN | DHX30/50 cellulose nitrate | Cellulose ester |
| CA | CA398-3 cellulose acetate | Cellulose ester |
| CA2 | CA320S cellulose acetate | Cellulose ester |
| Triacetin | Triacetin | Plasticizer |
| A4 | Citroflex ® A-4 acetyl tributyl citrate | Plasticizer |
| C4 | Citroflex C-4 tributyl citrate | Plasticizer |
| ELO | Epoxidized Linseed Oil | Plasticizer |
| W20 | N,N'-Ethylene-bis-oleamide | Amide Wax |
| Oleamide | Kemamide VO, Oleamide | Amide Wax |
| Erucamide | Kemamide E, Erucamide | Amide Wax |
| Kem P181 | Kemamide P181 N-Oleyl Palmitamide | Amide Wax |
| Paricin 220 | N-(2-hydroxyethyl) 12-hydroxystearamide | Amide Wax |
| Carn | Carnauba Wax | Natural Wax |
| MP70 | Castorwax MP70 hydrogenated castor oil | Wax |
| Dymerex | Dymerex | Dimerized Rosin |
| Pentalyn | Pentalyn C | Ester of Dimerized Rosin |
| PPE10 | Poly-Pale Ester 10 | Ester of Dimerized Rosin |
| L900 | Levapren 900 HV - VAE pellet | Biodegradable polymer (VAE) |
| L686 | Levamelt 686 - VAE pellet | Biodegradable polymer (VAE) |
| AF100 | Vinnapas 100HS - VAE emulsion, $T_g = 7°$ C. | Biodegradable polymer (VAE) |
| AF811 | Vinnapas EF811 VAE emulsion, $T_g = 12°$ C. | Biodegradable polymer (VAE) |
| AF1082 | Vinnapas 1082 VAE emulsion, $T_g = 24°$ C. | Biodegradable polymer (VAE) |
| AF192 | Vinnapas 192 VAE emulsion, $T_g = 10°$ C. | Biodegradable polymer (VAE) |
| V828M | Vinac 828M PVA emulsion, $T_g = 33°$ C. | Biodegradable polymer (PVA) |
| Flex 825 | Flexbond 825 PVA-acrylic emulsion, $T_g = 19°$ C. | Biodegradable polymer (PVA-acrylic) |
| AF1165 | Vinnapas EN1165 VAE emulsion, $T_g = 0°$ C. | Biodegradable polymer (VAE) |
| PLA | Polylactic Acid 4060 | Biodegradable polymer (PLA) |
| B79 | Butvar ® B-79 polyvinyl butyral | Biodegradable polymer (PVB) |
| Lecithin | Topcithin SF, sunflower lecithin | Release agent |
| MCT | Neobee M-5, medium chain triglyceride | Release agent |
| Isopar | Isopar C | Hydrocarbon solvent |

A standard test to measure the water absorption of paper and paperboard is known as the Cobb Test (see ASTM D 3285-93). Cobb tests are conducted for a set period of time such as 2 minutes or 20 minutes after which the absorption of water is measured gravimetrically on a known area of material. Table 2 shows a summary of Cobb tests for coated and uncoated starch/fiber based trays. The trays were designated Biosphere 18P002 (PPM100 material, 9 inch pie pan). Coatings were applied to the trays using a Nordson airless liquid spray system.

TABLE 2

Water Absorptiveness of 18P002 Pie Pans Using the Cobb Test Method Ring Size 25 cm²

| Coating | Dry Application Weight (g/m²) | 2 Minute Cobb value (g/m²) | Stdev |
|---|---|---|---|
| None | n/a | 65.3 | 2.0 |
| CAP 20% Dymerex 10% triacetin 5% Oleamide | ~11 | −0.1 | 0.2 |
| CAP 10% Triacetin | ~11 | 0.4 | 0.1 |

| Coating | Dry Application Weight (g/m²) | 20 Minute Cobb Value (g/m²) | Stdev |
|---|---|---|---|
| None | n/a | 149.1 | 2.1 |
| CAP 10% Triacetin | ~11 | 15.6 | 2.7 |
| CAP 10% Triacetin 5% Oleamide | ~11 | 19.0 | 4.8 |
| CAP/AF100 (3/1) 5% Oleamide 11% Lecithin 11% MCT | ~15 | 18.1 | 4.5 |
| CAP 20% Dymerex 5% Oleamide | ~11 | 9.9 | 1.5 |
| CAP/AF100 (1/1) 5% Oleamide | ~12 | 2.0 | 0.4 |
| CAP2/AF100 (1/2) 8% Oleamide | ~12 | 0.54 | — |

TABLE 2-continued

Water Absorptiveness of 18P002 Pie Pans Using the Cobb Test Method Ring Size 25 cm$^2$

| Coating | Dry Application Weight (g/m$^2$) | 20 Minute Cobb Value Hot Water$^a$ (g/m$^2$) | Stdev |
|---|---|---|---|
| None | n/a | 239.7 | 13.9 |
| CAP 10% Triacetin | ~11 | 29.9 | 4.5 |
| CAP 10% Triacetin 5% Oleamide | ~11 | 31.9 | 0.6 |
| CAP 20% Dymerex 5% Oleamide | ~11 | 40.9 | 14.1 |
| CAP/AF100 (1/1) 5% Oleamide | ~11 | 12.5 | 4.4 |

$^a$Initial water temperature 180° F.

The data in Table 2 shows that the coatings can substantially reduce the water up-take of an absorbent substrate such as a starch/fiber tray.

EXAMPLE 2

Amide Wax Improves Moisture Resistance Over Natural Wax

Waxes can be used to improve the moisture resistance of a coating. For example, as seen in FIG. 1, a coating composition comprising cellulose acetate propionate (CAP) and an ester of dimerized rosin (PPE10) in a ratio of 1.6:1, with 27% A4 plasticizer and 10% carnauba wax had an MVTR of 1275 (g-mil/m$^2$-day). This represents an improvement in moisture resistance by a factor of 2.9 over a coating using CAP alone, which had an MVTR of 3758 (g-mil/m$^2$-day).

However, by creating a coating composition comprising cellulose acetate propionate (CAP) and an ester of dimerized rosin (PPE10) in a ratio of 1.6:1, with 27% A4 plasticizer and 10% oleamide, a soluble amide wax, the MVTR was surprisingly reduced to 288 (g-mil/m$^2$-day). (FIG. 1) This represents an improvement in moisture resistance by a factor of 4.4 over the carnauba wax, and an improvement in moisture resistance by a factor of 13 over CAP alone.

Two amide waxes may be used to improve moisture resistance in embodiments of coating compositions described herein. FIG. 2 shows their impact on moisture resistance. A coating composition with a base of cellulose acetate propionate (CAP 482-0.5) with 10% Triacetin plasticizer gave an MVTR of 2323 (g-mil/m$^2$-day), a small improvement in moisture resistance over CAP alone. When, in addition to the CAP and Triacetin, 5% W20 (N-N'-Ethylene-bis-oleamide, a soluble amide wax) was added, the MVTR was reduced to 1776 (g-mil/m$^2$-day), which is an improvement in moisture resistance by a factor of 2.1 over CAP alone. Finally, if instead of adding W20 to the CAP and Triacetin, 5% Oleamide was added, the MVTR was further reduced to 991 (g-mil/m$^2$-day), which is an improvement by a factor of 3.8 over CAP alone. Therefore, while both amide waxes, W20 and Oleamide are effective in improving moisture resistance, in this instance Oleamide provided superior moisture resistance to W20. In higher temperature applications, however, the higher melting point of W20 versus oleamide may prove advantageous.

EXAMPLE 3

The Combination of CAP with PVB, PLA or VAE with an Amide Wax Remarkably Improves Moisture Resistance While amide waxes were surprisingly effective in improving moisture resistance over natural waxes as discussed in Example 2, coating composition moisture resistance was even more dramatically affected by the addition of biodegradable polymers, such as polyvinyl butyral (PVB) and polylactic acid (PLA) polymer and the biodegradable poly(vinyl acetate-ethylene) (VAE), as shown in FIG. 3.

As mentioned above, CAP alone has an MVTR of 3758 (g-mil/m$^2$-day). Adding PLA in a 1:1 ratio, with 10% triacetin plasticizer, resulted in an MVTR of 1148 (g-mil/m$^2$-day), an improvement in moisture resistance by a factor of 3.3. Adding only B79, Butvar® brand polyvinal butyral (PVB) in a 1:1 ratio resulted in an MVTR of 883 (g-mil/m$^2$-day), an improvement in moisture resistance by a factor of 4.3. Adding amide wax in addition to a biodegradable polymer gave an even larger improvement. A coating composition with CAP and the solid resin pellet poly(vinylacetate-ethylene) (VAE) L900 in a 1:1 ratio with 5% Oleamide reduced the MVTR to just 236 (g-mil/m$^2$-day)—an improvement in moisture resistance by a factor of 3.7 over CAP and PVB, 4.9 over CAP and PLA with plasticizer, and an improvement in moisture resistance by a factor greater than 15 over CAP alone.

Further, a coating composition with CAP and the aqueous emulsion poly(vinyl acetate-ethylene) (VAE) Airflex® 100HS in a 1:1 ratio with 5% Oleamide reduced the MVTR to a mere 84 (g-mil/m$^2$-day)—a 10.5× improvement in moisture reduction over CAP and PVB, a 13.7× improvement in moisture reduction over CAP and PLA with plasticizer, an improvement in moisture resistance by a factor of 2.8 over CAP and a solid VAE with Oleamide, and an improvement in moisture resistance by a factor of 44.7 over CAP alone. Thus, while PVB, PLA and VAE polymers all act synergistically with CAP, VAE is the most effective in this instance. In the solvent-based CAP coatings, addition of an aqueous emulsion of VAE also offers superior moisture resistance performance to addition of a solid resin. The VAE materials appear to act like a plasticizer in flexibalizing and drastically improving the moisture resistance of CAP based coating compositions.

The MVTR of a coating containing CAP and VAE in a 1:1 ratio and 5% Oleamide can be further reduced by modifying the order of adding the compositions. By adding the AF100 to the mixture last, the MVTR drops to 43 (g-mil/m$^2$-day). The solvent that was used in this formulation can also be adjusted to reduce VOC emissions. The use of 2-propanol/methyl acetate maintains the MVTR at 47 (g-mil/m$^2$-day). Both of these modifications represent an improvement in moisture resistance by a factor greater than 80 times compared to CAP alone.

EXAMPLE 4

Small prepared meal trays, designated as 11P001A from Biosphere Industries (PPM 100 starch/fiber based material), were spray coated on the inside with CAP and 10% triacetin (additive level based on dry wt. of CAP). The coating was dried for 2 minutes at 75° C. in a convection oven. The dry coating weight was 10-12 g/m$^2$. Single servings of drained green beans, cooked egg noodles with brown gravy, or cooked egg noodles with marinara sauce were placed into coated and uncoated controls trays. All trays were covered with aluminum foil and held refrigerated for 24 hours, then reheated in a 350° F. oven for 25 minutes. In all cases, the uncoated trays were soft and could easily be abraded with a spoon wherever food had been in contact with the tray. The coated trays were suitable firmer. Of the coated trays, only some of the trays holding brown gravy could be abraded using a spoon, and much greater effort was required to abrade the coated trays compared to the uncoated trays.

The test described above was repeated using only brown gravy. The coatings tested were CAP with 10% triacetin and 5% oleamide (additive level based on dry wt. of CAP) and 1/1 CAP/AF100 with 5% oleamide (additive level based on dry wt. of solids). With these coatings, the trays were quite firm after reheating and the coating could not be removed or damaged with reasonable effort using a spoon. In fact, it was very difficult to damage the coating using a fork and table knife.

EXAMPLE 5

Release Coatings

Two release enhanced coatings were prepared and the best moisture resistant coating was used as a control.

Moisture Coating 1: To 20 parts of denatured ethanol were added 6.6 parts of CAP followed by 45 parts of acetone and 11 parts of n-propyl acetate. The mixture was warmed to 40° C. and 0.66 parts of oleamide was added. After the oleamide has dissolved, a mixture of 12 parts of AF100 and 4.74 parts of water was added with stifling.

Release Coating 1: To 18.5 parts of denatured ethanol were added 9.9 parts of CAP followed by 45.5 parts acetone and 12 parts n-butyl acetate. The mixture was warmed to 40° C. and 1.32 parts of oleamide and 1.32 parts of MCT were added. After the oleamide was dissolved, a mixture of 6 parts AF100 and 5.46 parts water was added with stirring.

Release Coating 2: To 12.5 parts of denatured ethanol were added 9.9 parts of CAP followed by 44.5 parts acetone and 11 parts n-butyl acetate. The mixture was warmed to 40° C. with 0.64 parts of oleamide until dissolved. A mixture of 6 parts of AF100 and 4.46 parts water was added. When the AF100 has dissolved, a mixture of 1.5 parts lecithin, 1.5 parts MCT and 8 parts Isopar was added to create a fine dispersion of lecithin in the coating solution.

EXAMPLE 6

Release Coating Performance

Small loaf pan trays, designated as 11P004A from Biosphere Industries (PPM100 starch/fiber based material), were spray coated on the inside with several different coating formulations using a Nordson airless spray system. The coating was dried for 2 minutes at 75° C. in a convection oven. The dry coating weight was 12-15 g/m². These coatings are described in Example 5 as Moisture Coating 1 and Release Coatings 1 and 2. Release performance of several bakery items was testing in the coated loaf pans. A Betty Crocker pound cake mix was prepared per instructions on the box and baked for 30 minutes in a convection oven at 350° F. in the coated loaf pans. A Pillsbury Quick Nut Bread was also prepared per instructions on the box and baked for 30-40 minutes in a convection oven at 375° F. Release performance was scored on a scale from 1-3, where 1 represents clean release with no product remaining on the loaf pan; 2 represents some product remaining on the loaf pan, but the product can be removed intact; and 3 represents severe sticking of the product to the loaf pan, where the product cannot be removed from the pan without destroying the product. Bakery release performance for pound cake from coated loaf pans is seen in Table 3. As seen in Table 3, formulations containing wax and more preferably wax with lecithin and/or medium chain triglyceride offered improved release performance.

TABLE 3

Coated Loaf Pan Release Performance for Cakes and Breads

| Coating | Release Performance |
| --- | --- |
| Uncoated 11P004A (comparative) | 3 |
| Moisture Coating 1 | 2.5 |
| Release Coating 1 | 2 |
| Release Coating 2 | 2 |

EXAMPLE 7

Release Coating Performance

Pizza

Ten inch pizza disk trays, designated as 16P004A from Biosphere Industries (PPM100 starch/fiber based material), were spray coated on one side with several different coating formulations. The coating was dried for 2 minutes at 75° C. in a convection oven. The dry coating weight was 12-15 g/m². These coatings are described in Example 5 as Moisture Coating 1 and Release Coatings 1 and 2. Release performance of fresh Publix pizza dough, rolled onto the tray and covered with sauce, cheese, and pepperoni was tested on the coated pizza disks. The fresh pizza was prepared and baked for 20-25 minutes in a conventional oven at 380-400° F. Release performance was scored on a scale from 1-3, where 1 represents clean release with no crust remaining on the pizza disk; 2 represents some crust remaining on the pizza disk, but the pizza can be removed intact; and 3 represents severe sticking of the crust to the pizza disk, where the pizza cannot be removed from the pizza disk without destroying the pizza. Bakery release performance for pizza from coated pizza disks is seen in Table 4. As seen in Table 4, only formulations containing wax in combination with lecithin and/or medium chain triglyceride offered improved release performance.

TABLE 4

Coated Pizza Disk Release Performance for Fresh Pizzas

| Coating | Release Performance |
| --- | --- |
| Uncoated 16P004A (comparative) | 3 |
| Moisture Coating 1 | 2.5 |
| Release Coating 1 | 1 |
| Release Coating 2 | 1 |

EXAMPLE 8

MVTR of Uncoated and Coated Trays

A moisture resistant coating was prepared from 4 parts of CAP2, 14.55 parts AF100, 0.96 parts oleamide, 46.5 parts acetone, 9.6 parts water, 21.66 parts ethanol and 10 parts n-propyl acetate. Pie pans designated 18P002 from Biosphere Industries (PPM100 starch/fiber based material) were spray coated. The dry coating weight was about 12 g/m². The MVTR of coated and uncoated trays were measured as described above. The MVTR of the uncoated PPM100 material was 121,800 g-mil/m²-day. The moisture coated PPM100 material had an MVTR of 50,580 g-mil/m²-day.

EXAMPLE 9

Heat Sealing

A moisture resistant coating was prepared from 6.6 parts of CAP, 12 parts of AF100, 0.66 parts of oleamide, 45 parts acetone, 4.74 parts water, 20 parts ethanol and 11 parts n-propyl acetate. Pizza disks designated 16P004 from Biosphere Industries (PPM100 starch/fiber based material) were spray coated. The dry coating weight was about 15.3 g/m². Various packaging films, commonly used as tray lidding films, were sealed to the moisture resistant coated 16P004 disks with a Sencorp Sealer with the 1 inch wide seal head set at a temperature of 320° F., pressure of 60 psi, and dwell time of 2 seconds. One inch strips of the films, heat sealed to moisture resistant coated 16P004 disk, were cut and tested on an Instron at a speed of 10 inches/minute and a 1 inch grip separation, as per ASTM F88. The maximum force achieved during testing (lb/in) was recorded. Data for various non-biodegradable PET films (DuPont Mylar, OL and ECO grades have amorphous seal layers, RL has EVA seal layer) and biodegradable/compostable cellophane (Innovia NatureFlex, NE and NVS grades have heat seal coatings on both sides) and PLA (SKC Skywel, TE90 grade has amorphous heat seal layer on one side) films are shown in Table 5. For comparison, seal strength of the packaging films to a conventional, non-biodegradable crystallized PET tray is also shown. As seen in the table, the moisture resistant coating can be heat sealed with many types of lidding films to provide a range of seal strengths.

TABLE 5

Heat Seal Strength for Moisture Resistant Coated PPM100 Trays.

| | | Heat Seal Strength (lb/in) | |
|---|---|---|---|
| Lidding Film | | Moisture Resistant Coated PPM100 Tray | CPET Tray |
| DuPont Mylar | 75 gauge OL2 | 0.64 | 0.71 |
| | 100 gauge OL13 | 1.37 | 1.59 |
| | 100 gauge RL33 | 0.87 | 2.03 |
| | 100 gauge ECO23 | 1.23 | 0.04 |
| Innovia NatureFlex | 120 gauge NE | 0.47 | 0.50 |
| | 120 gauge NVS | 0.17 | 0.29 |
| SKC Skywel | 80 gauge TE90 | 1.02 | 0.04 |

EXAMPLE 10

A moisture resistant coating was prepared from 7 parts of CAP2, 12.95 parts of AF100, 1.12 parts of oleamide, 44 parts acetone, 3.87 parts water, 21.28 parts ethanol and 10 parts n-propyl acetate. Several moisture sensitive substrates were sprayed with this coating at a dry coating weight of about 13.7 g/m². Substrates included conventional copy paper (Staples, basis weight=75 g/m²), extra heavy duty chipboard (Paper Accents™, acid free, lignin free, basis weight=877 g/m²), uncoated cellophane film (Innovia NatureFlex 110 gauge NP), and PLA film (SKC Skywel 80 gauge TE90, coated on the non-heat seal side).

Cobb tests (see ASTM D 3285-93) were performed on several of the moisture sensitive substrates. Cobb tests were conducted for either 2 or 20 minutes after which the absorption of water was measured gravimetrically on a known area of material. Table 6 shows a summary of Cobb tests for coated and uncoated moisture sensitive substrates.

TABLE 6

Water Absorptiveness of Moisture Resistant Coated Substrates Using the Cobb Test method
Ring size 25 cm²

| Sample | Dry Application Weight (g/m²) | | Stdev |
|---|---|---|---|
| | | 2 Minute Cobb value (g/m²) | |
| Uncoated copy paper | n/a | 34.1 | 2.0 |
| Coated copy paper | 13.7 | 0.5 | 0.4 |
| Uncoated chipboard | n/a | 1202 | 13.6 |
| Coated chipboard | 13.7 | 0.6 | 0.1 |
| | | 20 Minute Cobb value (g/m²) | |
| Cellophane NP | n/a | 39.6 | 4.3 |
| Coated cellophane NP | 13.7 | 7.4 | 3.9 |

MVTR was measured on the uncoated and moisture resistant coated moisture sensitive substrates. The MVTR measurement procedure used in Example 1 was employed. Results can be seen in Table 7.

TABLE 7

MVTR of Uncoated and Moisture Resistant Coated Moisture Sensitive Substrates

| Sample | Dry Application Weight (g/m²) | MVTR (g-mil/m²-day) at 40° C. | Stdev |
|---|---|---|---|
| Uncoated copy paper | n/a | 22,544 | 1,081 |
| Coated copy paper | 13.7 | 4,534 | 75 |
| Uncoated chipboard | n/a | 153,374 | 1,813 |
| Coated chipboard | 13.7 | 56,731 | 4,392 |
| Cellophane NP | n/a | 3,257 | 561 |
| Coated cellophane NP | 13.7 | 2,202 | 545 |

Heat seal performance of the coated moisture sensitive substrates was measured. The heat seal method employed in Example 9 was utilized. For moisture resistant coated cellophane and PLA films, the coated films were heat sealed to Pie pans, designated 18P002 from Biosphere Industries (PPM100 starch/fiber based material), coated with a second moisture resistant coating. The second coating contained 4 parts of CAP2, 14.5 parts of AF100, 0.3 parts of oleamide, 46.5 parts acetone, 3.08 parts water, 21.6 parts ethanol and 10 parts n-propyl acetate. Results of the heat seal measurement are seen in Table 8. As seen in Table 8, the moisture resistant coating not only improves moisture resistance, but also improves the ability to heat seal moisture sensitive substrates.

TABLE 8

Heat Seal Strength (lb/in) for Moisture Resistant Coated Moisture Sensitive Substrates.

| Moisture Sensitive Substrate | DuPont Mylar 100 gauge OL13 | Innovia Natureflex 120 gauge NE | Coated 18P002 Pie Pan |
|---|---|---|---|
| Uncoated chipboard | 1.94 | 0.0 | NT |
| Coated chipboard | 0.68 | 0.35 | NT |

TABLE 8-continued

Heat Seal Strength (lb/in) for Moisture Resistant Coated Moisture Sensitive Substrates.

| Moisture Sensitive Substrate | DuPont Mylar 100 gauge OL13 | Innovia Natureflex 120 gauge NE | Coated 18P002 Pie Pan |
|---|---|---|---|
| Coated cellophane NP | NT | NT | 1.36 |
| Coated PLA TE90 | NT | NT | 0.43 |

NT: Not tested.

Although the invention has been described with respect to specific embodiments and examples, it will be readily appreciated by those skilled in the art that modifications and adaptations of the invention are possible without deviation from the spirit and scope of the invention. Accordingly, the scope of the present invention is limited only by the following claims.

What is claimed is:

1. A coating composition comprising:
   a cellulose ester;
   a wax comprising oleamide or N,N'-ethylene-bis-oleamide;
   a plasticizer; and
   a solvent.

2. The composition of claim 1 wherein the cellulose ester comprises cellulose acetate propionate, cellulose acetate butyrate, cellulose acetate, or nitrocellulose.

3. The composition of claim 1 wherein the plasticizer comprises a citric acid ester, triacetin or tributyrin.

4. The composition of claim 1 wherein the solvent comprises methyl acetate, ethyl acetate, propyl acetate, butyl acetate, ethanol, propanol, acetone, water, hydrocarbons.

5. The composition of claim 1, further comprising a rosin, wherein the rosin comprises dimerized rosin or glycerol esters of partially dimerized rosin.

6. A coating composition comprising:
   a cellulose ester;
   a wax comprising oleamide or N,N'-ethylene-bis-oleamide;
   a biodegradable polymer; and
   a solvent.

7. The composition of claim 6 wherein the cellulose ester comprises cellulose acetate propionate, cellulose acetate butyrate, cellulose acetate or nitrocellulose.

8. The composition of claim 6 wherein the biodegradable polymer comprises a polyvinyl acetate polymer, polylactic acid polymer, or polyvinyl butyral copolymer.

9. The composition of claim 6 wherein the biodegradable polymer comprises poly(vinyl acetate-ethylene) copolymer and the cellulose ester component comprises cellulose acetate propionate.

10. The composition of claim 9 wherein the solvent comprises methyl acetate, ethyl acetate, propyl acetate, butyl acetate, ethanol, propanol, acetone, water, hydrocarbons.

11. The composition of claim 6 wherein the solvent comprises methyl acetate, ethyl acetate, propyl acetate, butyl acetate, ethanol, propanol, acetone, water, hydrocarbons.

12. The composition of claim 6, further comprising a plasticizer, wherein the plasticizer comprises a citric acid ester, triacetin or tributyrin.

13. The composition of claim 6, further comprising a rosin, wherein the rosin comprises dimerized rosin or glycerol esters of partially dimerized rosin.

14. A coating composition comprising:
   a cellulose ester, wherein the cellulose ester comprises cellulose acetate propionate;
   an amide wax, wherein the amide wax comprises oleamide or N,N'-ethylene-bis-oleamide;
   a biodegradable polymer, wherein the biodegradable polymer comprises a polyvinyl acetate polymer, polylactic acid polymer, or polyvinyl butyral polymer; and
   a solvent, wherein the solvent comprises methyl acetate, ethyl acetate, propyl acetate, butyl acetate, ethanol, propanol, acetone, water, hydrocarbons.

15. The composition of claim 14 wherein the biodegradable polymer comprises an aqueous lattice of poly(vinyl acetate) polymer or poly(vinyl acetate-ethylene).

16. The composition of claim 14 wherein the biodegradable polymer comprises a polylactic acid polymer.

17. A method of manufacturing the composition of claim 14 comprising mixing the components of the composition that is not the biodegradable polymer, and then adding the biodegradable polymer.

18. A method of manufacturing the composition of claim 14 comprising mixing the components of the composition together, wherein the composition is not heated above the melting point of the amide wax.

19. A coating composition comprising:
   a cellulose ester;
   a biodegradable polymer;
   a release agent;
   a solvent; and
   a wax comprising oleamide or N,N'-ethylene-bis-oleamide.

20. The composition of claim 19 wherein the cellulose ester comprises cellulose acetate propionate, cellulose acetate butyrate, cellulose acetate or nitrocellulose.

21. The composition of claim 19 wherein the biodegradable polymer comprises a polyvinyl acetate polymer, polylactic acid polymer, or polyvinyl butyral copolymer.

22. The composition of claim 19 wherein the biodegradable polymer comprises poly(vinyl acetate-ethylene) copolymer and the cellulose ester component comprises cellulose acetate propionate.

23. The composition of claim 19 wherein the release agent comprises a phospholipid or a medium chain triglyceride.

24. An article comprising:
   a coating; and
   a substrate selected from the group consisting of starch, cellulose, cellulose derivative and PLA,
   wherein the coating comprises:
   a cellulose ester;
   a wax comprising oleamide or N,N'-ethylene-bis-oleamide;
   a plasticizer; and
   a solvent.

25. The article of claim 24 wherein the cellulose ester comprises cellulose acetate propionate, cellulose acetate butyrate, cellulose acetate, or nitrocellulose.

26. The article of claim 24 wherein the plasticizer comprises a citric acid ester, triacetin or tributyrin.

27. The article of claim 24 wherein the solvent comprises methyl acetate, ethyl acetate, propyl acetate, butyl acetate, ethanol, propanol, acetone, water, hydrocarbons.

28. The article of claim 24 wherein the coating further comprises a rosin, and wherein the rosin comprises dimerized rosin or glycerol esters of partially dimerized rosin.

* * * * *